Dec. 12, 1967    H. P. GONYEA    3,358,134
READING LAMP ASSEMBLY
Filed Sept. 17, 1965    2 Sheets-Sheet 1

INVENTOR.
Harold P. Gonyea
BY
E. J. Biskup
ATTORNEY

Dec. 12, 1967  H. P. GONYEA  3,358,134
READING LAMP ASSEMBLY
Filed Sept. 17, 1965  2 Sheets-Sheet 2
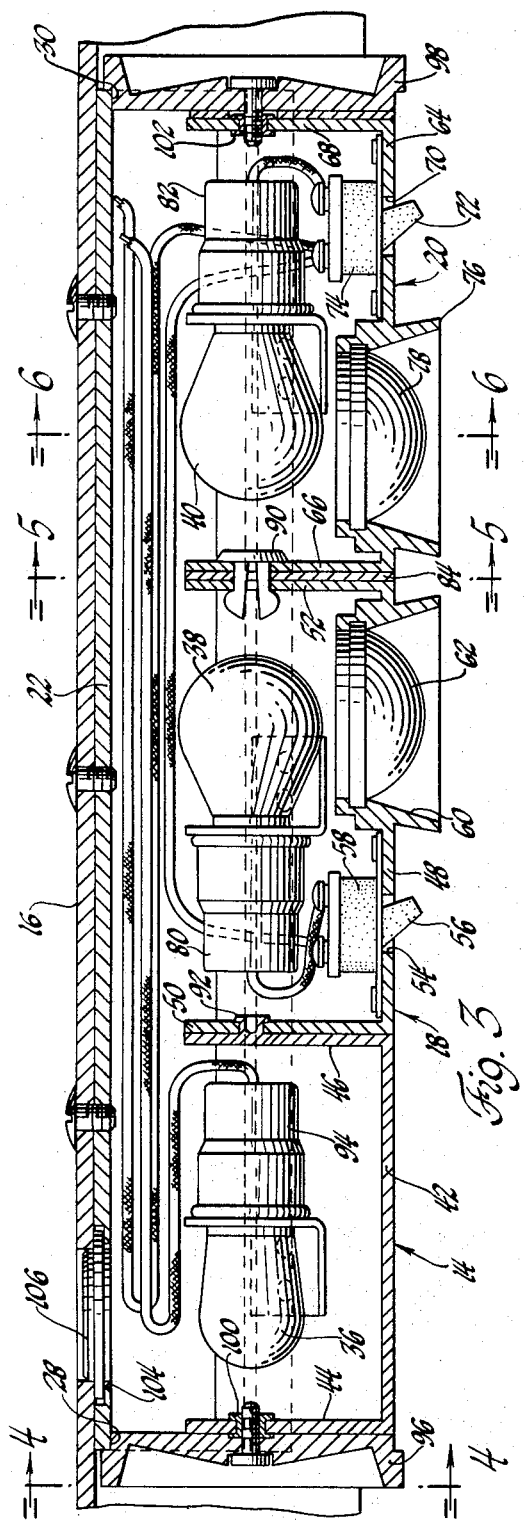
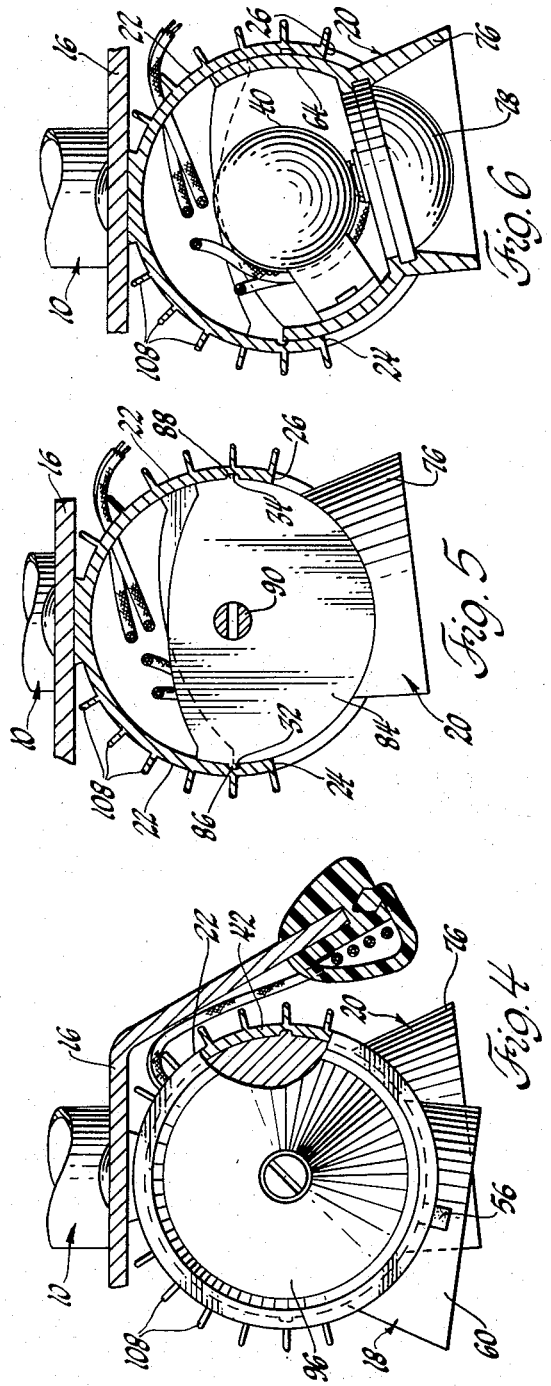
INVENTOR.
Harold P. Gonyea
BY
E. J. Biskup
ATTORNEY

# United States Patent Office 3,358,134
Patented Dec. 12, 1967

1

3,358,134
READING LAMP ASSEMBLY
Harold P. Gonyea, Birmingham, Mich., assignor to General Motors Corporation, Detroit, Mich., a corporation of Delaware
Filed Sept. 17, 1965, Ser. No. 488,157
7 Claims. (Cl. 240—7.35)

ABSTRACT OF THE DISCLOSURE

A reading lamp assembly having an elongated cylindrical lamp housing for the interior of a vehicle. First and second light sources are fixedly secured to and positioned within the housing and first and second lens support members are located adjacent the respective light sources. Each of the lens support members is mounted on the housing for rotation about the longitudinal axis of the housing and is provided with a light concentrating lens having its optical axis substantially normal to said longitudinal axis.

---

This invention concerns a reading and illumination lamp assembly for the interior of a passenger compartment such as found in airplanes, buses, railway passenger cars, and automobiles.

One object of the present invention is to provide a composite lamp assembly having individual passenger reading lamps that can be laterally and angularly adjusted to direct a beam of light.

Another object of the present invention is to provide a lamp assembly for a vehicle passenger compartment that can be incorporated with a luggage rack and provides general illumination of the compartment.

A further object of the present invention is to provide a lamp assembly having an adjustable reading lamp which supports the actuating switch for movement therewith.

A still further object of the present invention is to provide a vehicle interior lamp fixture which is easy to assemble, inexpensive to manufacture and has heat dissipating capabilities so as to increase the life of the lamp bulbs mounted therein.

The above objects and others are accomplished in accordance with the invention by providing a reading lamp assembly having an elongated cylindrical housing which can be secured to the underside of a luggage support or the like. First, second and third light sources are fixedly secured to and positioned within the housing at axially spaced points. A pair of independent lens support members are located adjacent two of the light sources and mounted on the housing for rotation about a common axis extending substantially parallel to the longitudinal axis of the compartment in which the lamp assembly is mounted. Bearing means are interposed between the lens support members and the housing for frictionally retaining each of the members in an adjusted position and a light concentrating lens is mounted in each of the support members with its optical axis substantially normal to the longitudinal axis of the housing. Finally, a light diffusing lens is fixed to the housing adjacent the third light source for projecting light rays in a direction substantially opposite to the light projecting direction provided by the light concentrating lenses.

A more complete understanding of the present invention can be derived from the following detailed description when taken in conjunction with the drawings in which:

FIGURE 3 is an enlarged sectional view taken on lines 3—3 of FIGURE 2.

FIGURE 4 is an end view of the lamp assembly taken on lines 4—4 of FIGURE 3.

FIGURE 5 is a sectional view taken on lines 5—5 of FIGURE 3.

FIGURE 6 is a sectional view taken on lines 6—6 of FIGURE 3.

Figure 1:
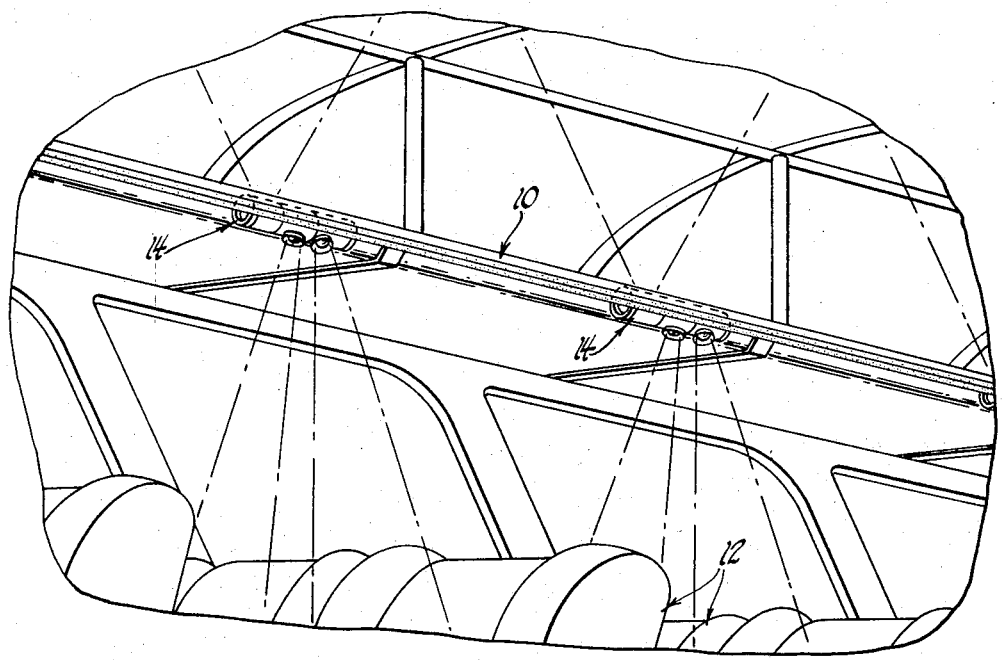
FIGURE 1 is a partial view of a vehicle passenger compartment showing a plurality of lamp assemblies made in accordance with the invention mounted to a luggage rack adjacent the passenger seats.
Figure 2:
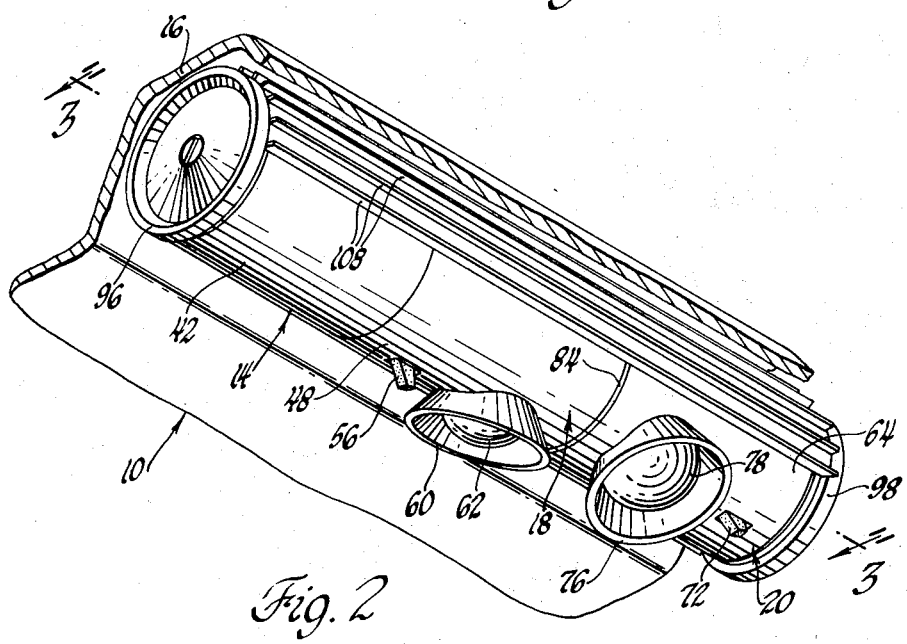
FIGURE 2 is an enlarged perspective view showing one of the lamp assemblies of FIGURE 1.

Referring now to the drawings and more specifically to FIGURES 1 and 2 thereof, a partial view of one side of an inter-city bus passenger compartment is shown comprising the usual luggage rack 10 which is situated above passenger seats 12 and constructed in a manner so as to accommodate a plurality of identical reading lamp assemblies 14 made in accordance with the invention. Each of lamp assemblies 14 is fixedly secured in a channel 16 formed at the inner edge of the luggage rack 10 and includes adjustable lens support members 18 and 20 both of which can be independently rotated about a common axis for purposes of projecting a concentrated beam of light towards one of the passengers for reading purposes.

As seen in FIGURES 3 and 5, each of the lamp assemblies 14 comprises an elongated housing 22 made in cylindrical form and having a cut-out portion at the lower end thereof so as to provide opposed terminating ends 24 and 26 each of which is located slightly below the horizontal center axis of the housing and lying in a plane that passes through the longitudinal center axis of the housing. The housing 22 is open at the opposite ends 28 and 30 thereof and includes longitudinally extending grooves 32 and 34 formed on the inside of the housing at diametrically opposed points. A lamp composite is located within the housing 22 and includes a general illuminating lamp 36 and a pair of reading lamps 38 and 40. The general illuminating lamp 36 is fixed to a cylindrically shaped housing 42 having ends thereof closed by integrally formed walls 44 and 46. The outer surface of the housing 42 has longitudinally extending ribs (not shown) formed thereon at diametrically opposed points. These ribs are adapted to be accommodated by the grooves 32 and 34 so that the housing 42 is precluded from any rotative movement relative to the main housing 22.

The lens support member 18 is formed similarly to the general illuminating housing in that it has a body portion 48 which is cylindrical in shape with integrally formed end walls 50 and 52. The lower end of the body portion 48 has an aperture 54 therein through which the actuator portion 56 of a switch 58 extends. Adjacent to the aperture 54 is a frusto-conical skirt 60 which is integrally formed with the body portion 48 and supports a light concentrating lens 62, the latter of which has its optical axis substantially normal to the longitudinal axis of the lamp assembly. The other lens support member 20 is substantially identical in construction to the lens support member 18 in that it also has a body portion 64 terminating with integral end walls 66 and 68. An aperture 70 is also provided in the lower end of this member for accommodating the actuator portion 72 of a switch 74. A frusto-conical skirt 76 is provided in the body portion 64 and supports a light concentrating lens 78 which has its axis normal to the longitudinal axis of the lamp assembly.

The light bulbs 38 and 40 are respectively located in sockets 80 and 82 which are fixed to the associated lens support member and electrically connected through the associated switch to a source of electrical power so that upon movement of the actuator the light bulb can be selectively energized or deenergized. Moreover, the lens support members 18 and 20 are separated from each other by a spacer 84 which, as seen in FIGURE 5, is formed with a pair of diametrically opposed outwardly extending tabs 86 and 88 which are respectively received in the grooves 32 and 34 provided in the main housing 22. A fastener 90 extends through the end walls 52 and 66 of the lens support members 18 and 20 and also through the spacer 84 so as to permit independent rotation of the lens support members about the longitudinal center axis of the main housing 22. In addition, the end wall 50 of the lens support member 18 is rotatably supported by a pivot connection 92 which is formed with and projects from the wall 46. A socket 94 is fixed to the housing 42 and supports the lamp bulb 36 along the same center axis which passes through the bulbs 38 and 40.

Thus, from the above it should be apparent that the general illuminating unit and reading lamp units 18 and 20 are a composite subassembly which can be slid into one or the other end of the main housing 22 during assembly. Once the composite lamp unit is positioned within the main housing 22, end caps 96 and 98 are then respectively fastened to the housing 22 and bearings 100 and 102 in the walls 44 and 68. The upper end of the housing 22, as viewed in FIGURE 3, has an opening 104 formed therein which accommodates a light diffusing lens 106. The general illuminating lamp 36 located below the lens 106 is connected in the usual manner to a light switch controlled by the operator of the vehicle so that the lamp assemblies 14 in the passenger compartment as seen in FIGURE 1 can be lit to indirectly light the vehicle passenger compartment. It will also be noted that as viewed in FIGURE 6 each of the lens support members 18 and 20 has the outer bearing surface of its base portion conforming in shape to the inner cylindrical surface of the main housing 22. Thus, each of the light concentrating lenses can be individually rotated by a passenger for projecting a light beam for reading or other purposes.

A lamp assembly of the above-described type having three light bulbs mounted therein will develop a substantial amount of heat when all three are lit simultaneously. Accordingly, some means for dissipating the heat is desirable and in this connection, a feature of this invention is to form the housing 22 with a plurality of radially extending fins 108, as seen in FIGURES 2 and 4 through 6, for dissipating this heat. Another feature of the invention is the simple steps required to assemble and disassemble the unit, inasmuch as it is only required to remove one of the end caps and slide the lamp composite unit out of the main housing 22. Hence, in case of lamp burn-out, a new lamp can be substituted very readily.

Modifications and other changes can be made in the above-described lamp assembly without departing from the spirit of the invention. Accordingly, it is to be understood that such changes and modifications are contemplated by the inventor and he does not intend to be limited except by the scope of the claims which follow.

I claim:

1. A reading and illumination lamp assembly for the interior of a vehicle, comprising an elongated cylindrical lamp housing, first, second, and third light sources fixedly secured to and positioned within said housing at axially spaced points, first and second lens support members located adjacent the first and second light sources respectively and mounted on the housing for rotation about the longitudinal axis of said housing, a light concentrating lens mounted in each of said support members with its optical axis substantially normal to said longitudinal axis, and a light diffusing lens fixed to said housing adjacent said third light source for projecting light rays in a direction substantially opposite to those provided by the light concentrating lens.

2. In combination with a vehicle passenger compartment having a plurality of seats arranged in pairs whereby two occupants can sit side-by-side, a luggage support located above said seats, a reading lamp assembly, said assembly comprising a housing secured to the underside of said luggage support, first and second light sources fixedly secured to and positioned within said housing, first and second lens support members located adjacent the respective light sources and mounted within said housing for rotation about a common axis extending substantially parallel to the longitudinal axis of said compartment, bearing means interposed between said lens support members and said housing for frictionally retaining each of said members in an adjusted position, and a lens mounted in each of said support members with its optical axis substantially normal to said common axis.

3. In combination with a vehicle passenger compartment having a plurality of seats arranged in pairs whereby two occupants can sit side-by-side, a luggage support located above said seats, a reading lamp assembly, said assembly comprising an elongated cylindrical housing secured to the underside of said luggage support, first and second light sources fixedly secured to and positioned within said housing, first and second lens support members located adjacent the respective light sources and mounted within said housing for rotation about a common axis extending substantially parallel to the longitudinal axis of said compartment, bearing means interposed between said lens support members and said housing for frictionally retaining each of said members in an adjusted position, a lens mounted in each of said support members with its optical axis substantially normal to said common axis, and an electric switch fixed to each of said support members for rotation therewith and for energizing the associated light source.

4. In combination with a vehicle passenger compartment having a plurality of seats arranged in pairs whereby two occupants can sit side-by-side, a luggage support located above said seats, a reading lamp assembly, said assembly comprising an elongated cylindrical housing secured to the underside of said luggage support, first and second light sources fixedly secured to and positioned within said housing, first and second lens support members located adjacent the respective light sources and mounted within said housing for rotation about a common axis extending substantially parallel to the longitudinal axis of said compartment, bearing means interposed between said lens support members and said housing for frictionally retaining each of said members in an adjusted position, a lens mounted in each of said support members with its optical axis substantially normal to said common axis, and a plurality of circumferentially spaced and longitudinally extending fins radially projecting from said housing for dissipating heat generated by said light sources.

5. In combination with a vehicle passenger compartment having a plurality of seats arranged in pairs whereby two occupants can sit side-by-side, a luggage support located above said seats, a reading and illumination lamp assembly, said assembly comprising an elongated cylindrical housing secured to the underside of said luggage support, first, second, and third light sources fixedly secured to and positioned within said housing at axially spaced points, first and second lens support members located adjacent the first and second light sources respectively and mounted on the housing for rotation about a common axis extending substantially parallel to the longitudinal axis of said compartment, bearing means interposed between said lens support members and said housing for frictionally retaining each of said members in an adjusted position, a light concentrating lens mounted in each of said support members with its optical axis substantially normal to said common axis, and a light diffusing lens fixed to said housing adjacent said third light source for projecting light rays in a direction substantially opposite to the light projecting direction provided by the light concentrating lens.

6. The combination of claim 5 wherein an electric switch is fixed to each of said support members for rotation therewith and for energizing the associated light source.

7. The combination of claim 6 wherein said lens support members are semicylindrical in shape.

References Cited

UNITED STATES PATENTS

| | | | |
|---|---|---|---|
| 1,844,624 | 2/1932 | Young et al. | 240—10 |
| 2,582,738 | 1/1952 | Arenberg | 240—7.35 |
| 2,622,189 | 12/1952 | Rahn | 240—7.35 |
| 2,957,073 | 10/1960 | Legge | 240—78 XR |
| 3,116,022 | 12/1963 | Davis | 240—47 XR |
| 3,179,791 | 4/1965 | Mole | 240—10.1 |

NORTON ANSHER, *Primary Examiner.*